Patented July 11, 1933

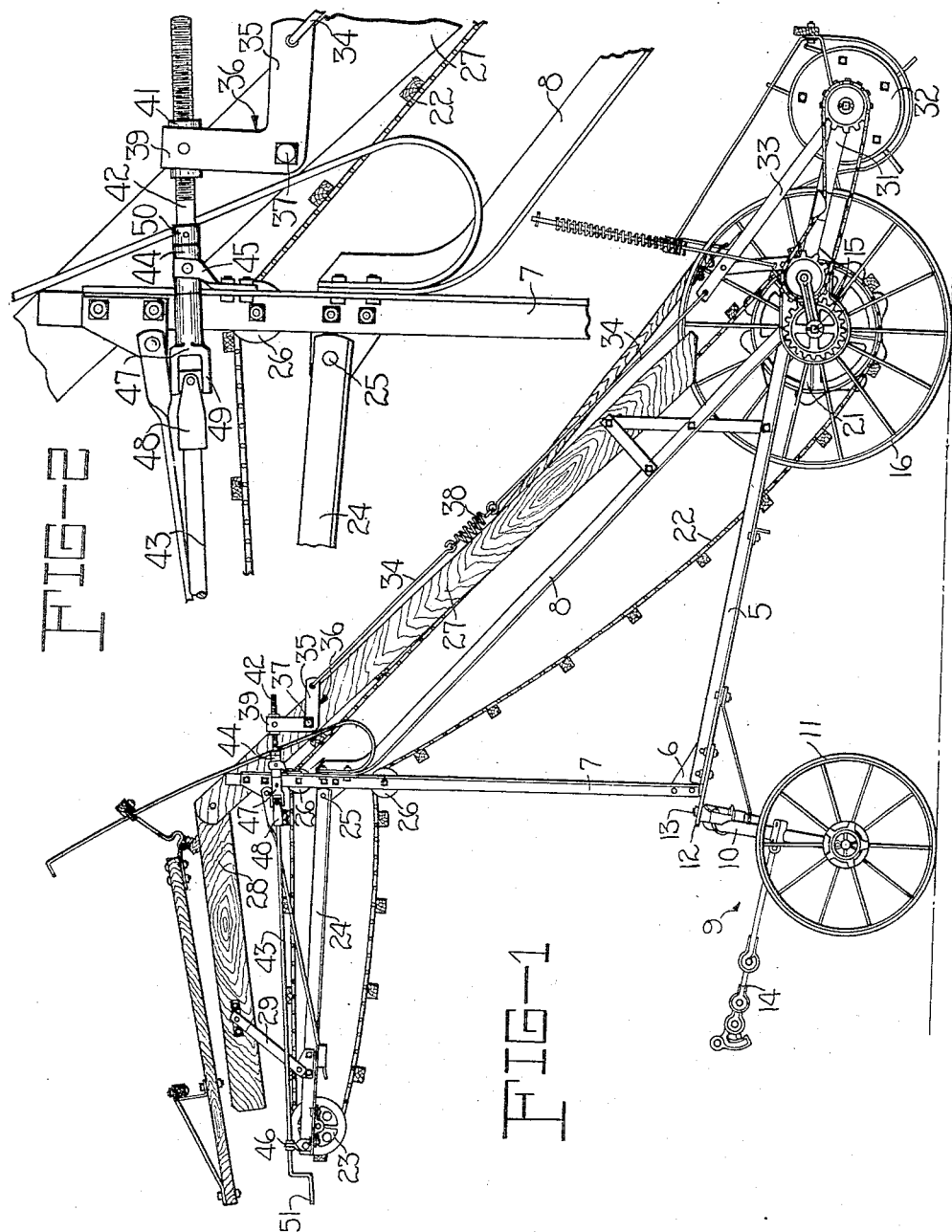

1,917,770

UNITED STATES PATENT OFFICE

HERMAN MOSCHEL, OF OTTUMWA, IOWA, ASSIGNOR TO DAIN MANUFACTURING COMPANY OF IOWA, OF OTTUMWA, IOWA, A CORPORATION OF IOWA

HAY LOADER

Application filed November 18, 1931. Serial No. 575,713.

My invention relates to hay loaders and particularly to that type of loader which employs a raking cylinder which is pivoted for vertical adjustment; and an object of my invention is to provide a mechanism for adjusting the raking cylinder, which extends to within reach of the operator on the wagon.

I have incorporated my invention in a hay loader of the type having a pivoted extension on the upper end of the elevator, the delivery end of which is adjustable vertically. In adapting my improved adjusting mechanism to a hay loader of this type I have constructed it in such a manner that the position of the raking cylinder is not affected when the elevator extension is adjusted.

Another object of my invention, therefore, is to provide in an implement of this type, an adjusting mechanism for adjusting the rear raking cylinder which mechanism is not affected by the raising or lowering of the elevator extension.

Other objects and advantages of my invention will be apparent to those skilled in the art after a consideration of the following detailed description, taken in conjunction with the accompanying drawing wherein:

Figure 1 illustrates a side elevational view of a hay loader embodying the novel arrangement for the adjusting mechanism of the rear raking cylinder; and, Figure 2 is an enlarged detail view illustrating a portion of the hay loader and adjusting mechanism.

The hay loader includes a frame comprising a pair of substantially horizontally disposed bars 5 which converge forwardly and are secured at their forward ends to a gusset plate 6, and a pair of vertically disposed bars 7 secured at their lower ends to the gusset plate 6 and diverging laterally therefrom. Inclined braces 8 extend between the free ends of the bars 5 and 7 and prevent these bars from spreading. The front end of the frame is supported on a conventional tongue truck 9 which includes an axle 10 and wheels 11. A plate 12 extends forwardly from a connection with the bars 5 and is pivotally connected by means of a pivot bolt 13 with the axle 10. A drawbar 14 extends forwardly from the axle 10 to engage a clevis which is fixed on the rear end of the wagon. A transverse axle 15 is supported on the frame bars 5 adjacent their rear end and a wheel 16 is mounted on each end thereof. The wheels 16 serve to support the rear end of the frame and to drive the mechanism of the hay loader.

A drum 21 is mounted on the axle 15 and an endless slatted elevator 22 is trained over this drum and over pulleys 23 mounted on the front end of a frame extension 24. The frame extension 24 is pivotally mounted at 25 on the vertical frame bars 7 adjacent the upper end thereof and is adapted to be swung upwardly as the load of hay is built up. Sheave pulleys 26 are supported on the bars 7 at each side of the pivot 25 and support the upper and lower runs of the elevator 22. A side board 27 is provided at each side of the elevator 22 and is supported on the bars 7 and 8 of the hay loader frame. Extension boards 28 are pivotally connected with the side boards 27 and are raised and lowered simultaneously with the frame extension 24 by means of connecting links 29.

An arm 31 is pivotally mounted at each side of the hay loader frame and extends rearwardly therefrom. The rear raking cylinder 32 is supported between the arms 31 adjacent their rear end and serves to gather the hay from the ground and deposit it on the endless elevator.

Under certain conditions it is desirable to adjust the hay raking cylinder 32 closer to or farther away from the ground. In hay loaders with which I am familiar, the adjusting mechanism for the raking cylinder is positioned in close proximity to the cylinder thereby making it necessary for the operator to leave the wagon to make the adjustment. My improved adjusting mechanism is positioned so as to be within reach of the operator on the wagon thus obviating the necessity of his leaving the wagon when it is desired to raise or lower the raking cylinder. This adjusting mechanism comprises a link 33 inclined forwardly from the rear end of one of the arms 31 and a shifting rod 34 connecting the upper end of this link with the arm 35 of a bell crank 36 which is pivotally mounted at 37 adjacent the upper end of the side board 27. A spring 38 is provided intermediate the ends of the rod 34 to supply a resilient floating action to the raking cylinder. A threaded nut 41 is pivotally supported on the arm 39 of the bell crank 36 and the threaded end of an adjusting rod 42 engages with the nut. The adjusting rod 42 is journaled in a sleeve 44 which is pivotally mounted in a bracket 45 secured on the bar 7 of the loader frame. The forked member 47 of a universal joint 49 is secured on the forward end of the adjusting rod 42 and engages a companion forked member 48 which is secured on the rear end of a shaft 43. The shaft 43 extends forwardly from the universal joint and is supported in a bearing bracket 46 which is mounted on the forward end of the frame extension 24. The shaft 43 extends forwardly beyond the bearing bracket 46 and a crank 51 is formed on the forward end thereof and is within reach of the operator on the wagon. The universal joint 49 is positioned in close proximity to the pivot 25 of the frame extension so that the crank 51 is maintained in the same position, relative to the end of the frame extension, in all of the adjusted positions of the frame extension. The forked member 47 of the universal joints 49 contacts with the front end of the sleeve 44 and a collar 50 is secured on the adjusting rod adjacent the opposite end to prevent longitudinal sliding movement of the adjusting rod 42.

In the operation of the hay loader the hay is picked up by the raking cylinder and is delivered to the inclined elevator which conveys it upwardly to a point of discharge on a wagon. The type of hay loader in which I have incorporated my invention employs an extension frame which is pivotally mounted on the upper end of the elevator frame and is adapted to overhang the rear end of the wagon. The inclined elevator is trained over the extension frame and is raised and lowered with the frame. The extension frame is adjusted to a lowered position when the load of hay is started and is raised as the load builds up. By adjusting the frame extension in this manner the hay is not dropped any appreciable distance and is therefore not blown by the wind. Because of varying conditions in the field it is frequently necessary to adjust the raking cylinder and it has been found particularly desirable to make this adjustment from the wagon rather than from some remote point. The advantage in making this adjustment from the wagon is obvious, since the load of hay may be nearly completed at which time the operator is stationed a considerable height from the ground. In making this adjustment on other hay loaders with which I am familiar and in which the adjustment is made from the ground, it is necessary for the operator to climb down off the load, make the adjustment and then climb back on the load again before resuming operations, thereby causing considerable inconvenience and loss of time to the operator. The mechanism which I have provided for adjusting the raking cylinder is controlled by the operator on the wagon by merely turning the crank 51 of the shaft 43. The crank 51 is always within easy reach of the operator since it is supported on the front of the frame extension and is adjusted simultaneously therewith. The adjusting rod 42 is rotated by the shaft 43 and through its engagement with the nut 41 the bell crank 36 is rocked about its pivot 37. The rocking action of the bell crank causes a shifting of the rod 34 which adjusts the cylinder toward or away from the ground. It will be readily understood that by positioning the universal joint in close proximity to the pivot 25 of the frame extension, the crank 51 will be supported in the same position relative to the frame in all of the positions of the frame extension. The weight of the raking cylinder normally holds the forked member 47 in contact with the sleeve 44, and the collar 50 prevents the adjusting rod from sliding longitudinally in the bearing sleeve 44. When the frame extension is adjusted the shaft 43 pivots at the universal joint 49 and therefore does not affect the adjusting rod 42. This novel arrangement permits the adjustment of the raking cylinder from the wagon and as previously described is not affected by the adjustment of the frame extension.

While I have described in connection with the accompanying drawing the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. In a hay loader, a wheel supported frame adapted to be attached to a wagon, an inclined elevator supported on the frame and having an elevator extension pivotally mounted on the upper end thereof and adapted to overhang the adjacent rear end of the wagon, a raking cylinder adjustably supported at the rear end of the frame, and means for vertically adjusting the raking cylinder from the wagon, said means being supported on the frame and the elevator extension and having a joint in proximity to the pivot of the elevator extension.

2. In a hay loader, the combination of a wheel supported frame adapted to be attached to a wagon, an inclined elevator supported on the frame and adapted to overhang the adjacent rear end of the wagon, a raking cylinder adjustably supported at the lower end of the inclined elevator, and means for vertically adjusting the raking cylinder comprising a bell crank pivotally mounted on one side of the frame adjacent the upper end thereof, a connection between one arm of the bell crank and the raking cylinder, a nut pivotally supported in the other arm of the bell crank, an adjusting rod supported in a bearing mounted on the loader frame and threaded into said nut, and means for rotating the adjusting rod.

3. In a hay loader, the combination of a wheel supported frame adapted to be attached to a wagon, an inclined elevator supported on the frame, an elevator extension pivotally mounted on the upper end of the frame and adapted to overhang the adjacent rear end of the wagon, a raking cylinder adjustably supported at the lower end of the inclined elevator, and means for vertically adjusting the raking cylinder comprising a bell crank pivotally mounted on one side of the frame adjacent the upper end thereof, a connection between one arm of the bell crank and the raking cylinder, a nut pivotally supported in the other arm of the bell crank, an adjusting rod supported in a bearing mounted on the loader frame and threaded into said nut, a shaft journaled in a bearing on the elevator extension, and a universal joint connecting the adjusting rod and the shaft.

4. In a hay loader adapted to be attached to a wagon, a wheel supported main elevator frame, an extension elevator frame pivoted to the upper end of the main elevator frame and adapted to overhang the wagon, a raking cylinder adjustably supported at the lower end of the main elevator frame, means for vertically adjusting the cylinder from the wagon including a control member mounted on the free end of said extension elevator frame, and a connection between said control member and said raking cylinder including a joint near the point of pivotal connection between said frames.

5. In a hay loader adapted to be attached to a wagon, a wheel supported main elevator frame, an extension elevator frame pivoted to the upper end of the main elevator frame and adapted to overhang the wagon, a raking cylinder adjustably supported at the lower end of the main elevator frame, means for vertically adjusting the cylinder from the wagon including a control member mounted on the free end of said extension elevator frame, a rocking member pivotally mounted on one of said frames adjacent the point of pivotal connections between said frames, means connecting said control member with said rocking member whereby said rocking member is rocked by actuating said control member, and means connecting said rocking member with said raking cylinder.

6. In a hay loader adapted to be attached to a wagon, a wheel supported main elevator frame, an extension elevator frame pivoted to the upper end of the main elevator frame and adapted to overhang the wagon, a raking cylinder adjustably supported at the lower end of the main elevator frame, and means for vertically adjusting the raking cylinder comprising a nut supported on the main elevator frame for longitudinal movement with respect thereto, an adjusting rod threaded into said nut and restrained against endwise movement relative to the main elevator frame, means at the free end of said extension elevator frame for rotating the adjusting rod, and a connection between said nut and said raking cylinder.

HERMAN MOSCHEL.